(12) United States Patent
Levitan

(10) Patent No.: US 7,949,781 B1
(45) Date of Patent: May 24, 2011

(54) FLOW ROUTING FOR REDUCING INTERNET CONGESTION

(76) Inventor: Gutman Levitan, Jupiter, FL (US)

( * ) Notice: Subject to any disclaimer, the term of this patent is extended or adjusted under 35 U.S.C. 154(b) by 0 days.

(21) Appl. No.: 12/928,784

(22) Filed: Dec. 20, 2010

(51) Int. Cl.
*G06F 15/16* (2006.01)
(52) U.S. Cl. .......................................... 709/235; 709/223
(58) Field of Classification Search .................. 709/235, 709/223
See application file for complete search history.

*Primary Examiner* — Kyung-Hye Shin
(74) *Attorney, Agent, or Firm* — Ilya Zborovsky

(57) ABSTRACT

For reducing Internet congestion caused by multiple flows of the same popular content transmitted to different destinations, a single flow of content is transmitted from the content hosting server to an Internet regional domain using a conventional exterior routing and in the regional domain, using an interior flow routing. Inside of regional domain, packet destination address is replaced by a flow number, which is used as a local and temporary alias of content. This enables recipient devices that have requested the same content and have been provided with the flow number to receive the same flow of packets and thus to prevent congestion and delays in content delivery that may be caused by multiple separate flows of the same content transmitted from the content hosting server to recipients at different recipients' addresses. The technology implementation is local to a singly administered regional system and does not require any change to the global Internet infrastructure.

8 Claims, 5 Drawing Sheets

(a) (b) (c) (d)

(a)

| Version | IHL | Type of service | Total length | |
|---|---|---|---|---|
| Identification | | | Flags | Fragment offset |
| Time to live | | Protocol | Header checksum | |
| Source address | | | | |
| Destination address | | | | |
| Options/padding | | | | |

(b)

| Version | IHL | Type of service | Total length | |
|---|---|---|---|---|
| Identification | | | Flags | Fragment offset |
| Time to live | | Protocol | Header checksum | |
| Flow number | | | | |
| Null | | | | |
| Options/padding | | | | |

Fig. 4

| Pream | SFD | Destination | Source | LEN | Data | PAD | CRC |

Fig. 5

(a)
| In Port | IP Addr | Priority | Out Port | Flow Num | MAC A/MA |

(b)
| In Port | Flow Num | Priority | Out Port | MAC A/MA |

Fig. 6

FLOW ROUTING FOR REDUCING INTERNET CONGESTION

FIELD OF THE INVENTION

This invention relates to the field of computer networks and more specifically, to technology for reducing Internet congestion and latency.

BACKGROUND OF THE INVENTION

Internet congestion is originated in the Internet protocol, known as TCP/IP, that delivers data at network addresses thus transmitting a separate stream of data packets to each client computer even when many clients are requesting the same web content. The one-to-one delivery model provides interactivity and an obvious way of error handling but it wastes bandwidth whenever a high-demand content is transmitted. Bandwidth determines the network throughput and is the most limited network resource. When there is not enough bandwidth, traffic congestion causes delays in content delivery. The more Internet users are trying to access the same content, the more chance they experience delays in content presentation. The growing demand of bandwidth-hungry video over the Internet is putting a strain on Internet service providers (ISPs) who are fighting back by limiting access and/or interfering in Internet traffic.

This problem is not known in radio and television because in a broadcast system multiple receivers are tuned to the same channel, receive the same signal and thus get the same "copy" of content. In digital radio and television, audio and video is transmitted as a stream of data packets and a channel identifier is included in the packet header. Bandwidth is reserved for each channel and user's choice is limited to what is scheduled for transmission on the channels. Like dedicated phone lines, which waste bandwidth when not used, dedicated channels waste bandwidth when a content in low or no demand is transmitted.

IP multicasting is a technique for conserving bandwidth by sending packets from one Internet location to many others without unnecessary packet duplication. According to this technique, one packet stream, which could be audio or video or other type of data, is sent from a source to many locations on the Internet and is replicated in the network as needed to reach simultaneously as many end-users as necessary. Multicast commercial applications include webcasting, multi-party computer games and conference calls.

In order to take advantage of one-to-many delivery provided by IP multicasting, user computers join a "multicast group". The group is created by a multicast application that runs multicast protocols for a specific source and specific destinations over "multicast enabled" routers. If a group for delivery of a desired content has not been created, there is nothing to join. A multicast group is not created dynamically in response to a sudden and temporary demand for a particular content. Moreover a group often cannot be created because of lack of multicast enabled routers between source and destination. This limits choice of content delivered in one-to-many manner by sources of already existing multicast groups. As a result, the contribution of IP multicast to reducing Internet congestion is limited respectively.

Another multicast problem is handling transmission errors. The guaranteed error-free data delivery over the Internet is provided by an acknowledgement mechanism of TCP protocol. According to the protocol, the sender retransmits a packet if the receiver does not acknowledge the reception of the error-free packet. The positive acknowledgement or ACK provides for both packets recovery and congestion control: the sender slows down if ACKs are delayed. A "negative acknowledgement" or NAK, which is a request for retransmission of a lost or corrupted packet, is used for packet recovery only. In a multicast application, many client computers receive the same packet stream and therefore the same corrupted packet, which is a problem if a guaranteed error-free data delivery is required. On one hand, if each client submits a retransmission request it would essentially reduce bandwidth savings provided by multicast. On the other hand, it would be wrong to designate a particular client computer in a multicast group as a retransmission requester on behalf of all clients because the group formation is out of control: any client can join or leave the group at any time. Errors in audio and video, although annoying, can be localized but software with errors does not work. That is why IP multicasting, which incorporates UDP instead of TCP in the transport layer, is mainly used for transmission of audio/video streams and does not fit for distribution of software, thereby further limiting contribution of IP multicast to reducing Internet congestion.

More practical method of bandwidth saving is web caching. Many ISPs, universities and corporations are using proxy caches to store copies of frequently accessed web content so that subsequent requests may be satisfied from the cache if certain conditions are met. Web caching provides essential bandwidth savings because a single copy of content is delivered from its origin server located anywhere in the world to a proxy cache positioned closer to users. But the savings are partial because locally i.e., from the proxy server to client computers the content is still distributed as separate streams of packets. It is therefore desirable to have a way of one-to-many data delivery that is free from IP multicast limitations.

U.S. Pat. No. 7,240,105 to Satran et al. discloses a method and system that combines content caching with multicast data delivery. The cache is formed as a multilevel hierarchical tree so that requests for content by end-user clients are received by the lowest level cache and forwarded as necessary to higher levels in the hierarchy.

U.S. Pat. No. 7,133,928 to McCanne discusses advantages of an application-level overlay routing protocol. Exploiting multicasting in a singly administered regional domain, as opposite to disjoint multicast networks that span multiple administrative domains with heterogeneous equipment and different multicast implementations, the protocol allows data distribution and bandwidth management to be handled in a more cohesive and intelligent fashion.

U.S. Pat. No. 6,374,303 to Armitage et al. discloses a multicast adaptation of Internet MPLS protocol. MPLS, which stands for Multi-Protocol Label Switching, provides for explicit routing and as a result, more efficient data forwarding based on the use of fixed size labels attached to packets.

U.S. Pat. No. 6,061,738 to Osaku et al. teaches using numbers as URL aliases and thereby avoiding the need to know and input URLs, which are long strings of characters.

U.S. Pat. No. 6,973,050 to Birdwell et al. discloses a transmission announcement system for use in conjunction with a unidirectional data broadcast system in which data is served simultaneously to multiple clients. The system sends out announcements of upcoming broadcast transmissions thereby enabling clients to select and receive transmissions of interest.

U.S. Pat. No. 7,590,245 to the same applicant discloses a system providing anonymity of communications by transmitting information in packets that do not contain source and destination addresses included in a packet header or anywhere in the packet. The anonymous packets are forwarded from a source host to a destination host by a randomly chosen flow number over a sequence of flow routers.

U.S. patent application Ser. No. 12/291,522 of the same applicant discloses a method and system for reducing Internet congestion by transmitting popular content in a broadcast manner. In the system, a single copy of content is delivered from its origin server located anywhere in the world to a broadcast server according to the standard Internet protocol. From the server, that serves an Internet regional domain, the content is transmitted as a flow of packets with a flow number placed in the packet's header. Clients, that have requested the same content, simultaneously download packets with the flow number thereby avoiding congestion and delays in content delivery. However the two-step delivery has a limitation: only one at a time content can be directed at the broadcast server address and that does not work well for live media streams concurrently transmitted to the regional domain. Therefore it is desirable to remove this "bottleneck"—the broadcast server—from a flow routing system.

SUMMARY

Accordingly, reducing Internet congestion and latency is the main object of the present invention.

Another object is to facilitate transmission of high-quality live and stored video over the Internet without putting a strain on service providers.

A further object is to provide error-free data delivery in one-to-many manner.

A still further object is to provide quality of service through traffic management and prioritization.

A still further object is to improve security of communications over the Internet via packets' anonymity.

In keeping with this objects and with others, which will become apparent hereinafter, the present invention consists, briefly stated, in transmission of a single flow of web content from a content hosting server to an Internet regional domain using a conventional exterior routing and in the regional domain, using an interior flow routing. In the regional domain, packets carrying a web content are modified by flow routers that replace a destination address by a flow number and forward packets by the flow number. The interior flow number is randomly assigned to content URL as a local and temporary content alias and the exterior destination address is randomly selected from a pool of addresses allocated to the regional domain and is not necessarily the address of client that has requested the content. This arrangement allows Internet client devices that have submitted requests for the same content and have been provided with the flow number to receive the same flow of packets and thus to prevent congestion and as a result, delays in content delivery that may be caused by multiple separate flows of the same content transmitted from the content hosting server to clients at different clients' addresses.

Thus the present invention may be considered either as an improvement or alternative to IP multicast. Its novel features are set forth in particular in the appended claims. The invention itself, however, will be best understood from the following description of specific embodiment when read in connection with the accompanying drawings.

BRIEF DESCRIPTION OF THE DRAWINGS

FIG. 4 shows IP datagram header and a header modified for flow routing.

FIG. 5 shows layout of Ethernet frame.

FIG. 6 shows layout of entries in a flow-forwarding table.

DESCRIPTION OF THE PREFERRED EMBODIMENTS

According to the conventional Internet Protocol (IP), a web content is delivered in data packets and packets are forwarded from the content hosting server to a client computer at the network address of the computer. Client computers have different network addresses and as a result, a separate flow of packets with a different destination address is transmitted from the content hosting server to each client even when many clients are requesting the same content. If packets carrying a particular content could be marked by a content identifier, then all client computers that request the same content would be able to distinguish the packets of requested content from other packets transmitted over the network and thus to receive the same flow of packets. But Internet content identifier called URL (Universal Resource Locator) is a long string of characters that does not fit in a packet header. However under certain conditions, which are met in the system of present invention, packets can be marked by a short alias of content that fits in the address space of packet header.

The Internet comprises many regional systems connected by backbones and individually managed by large independent service providers. An autonomous regional system is both a management domain and routing domain: it may use interior routing protocols and maintain interior routing tables. In the system of present invention, a single flow of web content is transmitted from its hosting server located anywhere in the world to an Internet regional domain using a conventional i.e., IP exterior routing and in the regional domain, using an interior flow routing. In the regional domain, packets carrying a web content are modified by a flow router that replaces the packet destination address by a flow number assigned to content URL as a content alias. It is possible because unlike the URL, which is global and permanent, the alias is local and temporary. The flow number is selected randomly and needs only to be different for each content currently transmitted across the regional domain. As soon as transmission is over, the flow number could be recycled, i.e. assigned to other content.

Figure 1:
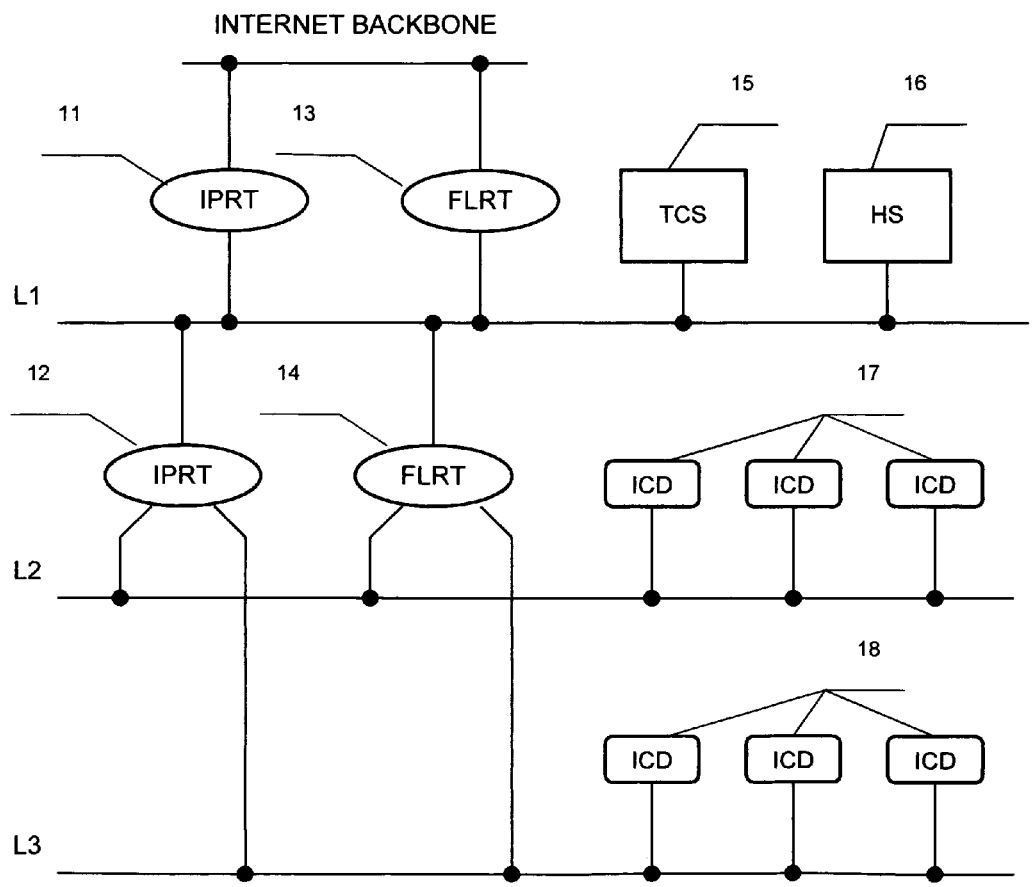
FIG. 1 illustrates flow routing according to the present invention.

A system adapted for flow routing according to the present invention is illustrated by FIG. 1 that shows a part of regional domain with three interconnected local area networks (LANs) L1, L2 and L3 and a few Internet client devices 17 and 18 while in a singly administered domain there are many LANs and many clients connected to each LAN. Users of client devices, such as desktop, laptop or tablet computers and smart phones, submit requests for web content in a conventional way, i.e. by typing or copying a URL in the browser address bar or clicking on a link that is associated with a URL. The requests from clients are directed to a traffic control server 15 over a conventional IP router 12.

The traffic control server 15 assigns a flow number to the submitted URL as an alias of requested content and provides all client devices that have submitted the URL with the flow number so that the devices would be able to distinguish packets of requested content from other concurrently transmitted packets. The server 15 sends individual notifications containing the flow number to clients at their different network addresses. The assigned flow number is placed in an "in-use list". After the content transmission is over, the number is removed from the list and thus may be assigned to other URL. This ensures that all content flows concurrently transmitted across a regional domain have randomly chosen but different flow numbers.

The traffic control server 15 assigns also a destination address to the URL. While the conventional request for a web content submitted to a content hosting server includes the content URL and a client network address, a destination address assigned by server 15 is selected from a pool of addresses allocated to the regional domain and is not necessarily the address of client that has requested the content. If the content hosting server is located outside of regional domain then the assigned address is used for exterior routing of packets carrying the requested content from the hosting server to the regional domain. If the hosting server is located inside of regional domain, as the server 16 connected to L1, the destination address is still used because the server could be origin server or caching server and the former may receive requests from outside of regional domain. If both internal and external requests for content have the same conventional form then no change in operations of web servers, both origin and caching ones, is necessary.

There are a number of reasons why any "not in-use" address selected from the pool of addresses allocated to the regional domain is as good as any other. First, the destination address is not used for delivery of packets to a client but only to the regional domain and in the regional domain the address is replaced by a flow number. Second, whatever address is selected from the pool of addresses allocated to a regional domain, the packets will be directed to the regional domain. Third, if an "audience" of clients i.e., more than one client, is receiving the same content, for example a TV show, only one destination address is needed for exterior routing of packets carrying the show from a hosting server to the regional domain. There is no advantage of using an address of one of those clients because the client may leave the audience any time and request other show while its address would still be "in use" for the show and may not be assigned to other show. Fourth, if only one client has requested a particular content, another client can do it later and then the "audience situation" will take place. And fifth, randomly selected addresses improve network security providing anonymity of communications and privacy protection.

Confidential or sensitive information transmitted over the Internet is protected by some form of encryption. It may also be desired to conceal from an outside observer the fact of communication itself. For example, companies that want to keep their research interests secret would like to prevent outsiders from knowing which web sites their employees are visiting. In such cases anonymity of communications becomes an issue.

Like Internet congestion, the problem of privacy and anonymity stems from the Internet Protocol. According to the protocol, information is transmitted in packets and source and destination addresses of the information are placed in the header of each packet. As a result, an interceptor may trace data exchange between parties of interests, which makes any communicating party an easy target of malicious actions ranging from eavesdropping to denial of service (DOS) attack. Randomly selected addresses, along with randomly selected flow numbers, conceal real packet destination making it harder for an outside observer to trace online activities. Applying public/private key encryption to messages exchanged between the traffic control server and client devices may further improve anonymity of communications.

No matter how many client devices have requested a web content, the traffic control server 15 sends a single request to the content hosting server over a conventional IP router 11 and an Internet backbone thereby reducing traffic on the hosting server and routers outside of regional domain that forward content packets to the regional domain. At the same time, it makes no difference for operations of the hosting server and the exterior routers whether the request is submitted on behalf of one client, two clients or a large audience of clients. All arrangements facilitating the one-to-one and one-to-many content delivery are local to a singly administered regional system and no support outside of the regional system is necessary. In particular, routers on the way from a source to a regional domain do not need to be "multicast enabled". Therefore, while implementation of flow routing in each autonomous system contributes to reducing of overall Internet traffic, no change to the global Internet infrastructure is required. And this is crucial for any new Internet technology implementation.

Web information is delivered to a user interactively i.e., in response to the user request. The information is retrieved and presented to user by a web client program called web browser. The process begins when the user inputs a URL into the browser by typing or copying the URL in the browser address bar or just clicking on a link associated with the URL. A URL consists of a prefix, a domain name assigned to a targeted web server and a path to a file or stream to be fetched from the server. The most commonly used prefix is http. Many browsers also support a variety of other prefixes, such as https and ftp. When the browser makes a request, domain name is translated by a DNS server to the hosting server's IP address. In order to access a requested content the hosting server appends the URL path to a path of its root directory.

In the interactive environment, a content audience is a group of client devices that submit a request for that content simultaneously or almost simultaneously i.e., during a short time interval. The interval should be small enough so that a delay in content delivery would not annoy users. But the smaller interval the lesser audience and therefore the lesser contribution of flow routing to reducing Internet congestion. In order to meet these conflicting requirements the traffic control server separates requests submitted by single clients from requests submitted by multiple i.e., two or more clients so that the former would be executed immediately and the latter at the end of a time interval thus allowing a time for audience formation. If the chosen time interval is, for example, 4 sec then the controlled delays in request execution will be in the range 0 to 4 sec with average delay equal 2 sec.

Figure 2:
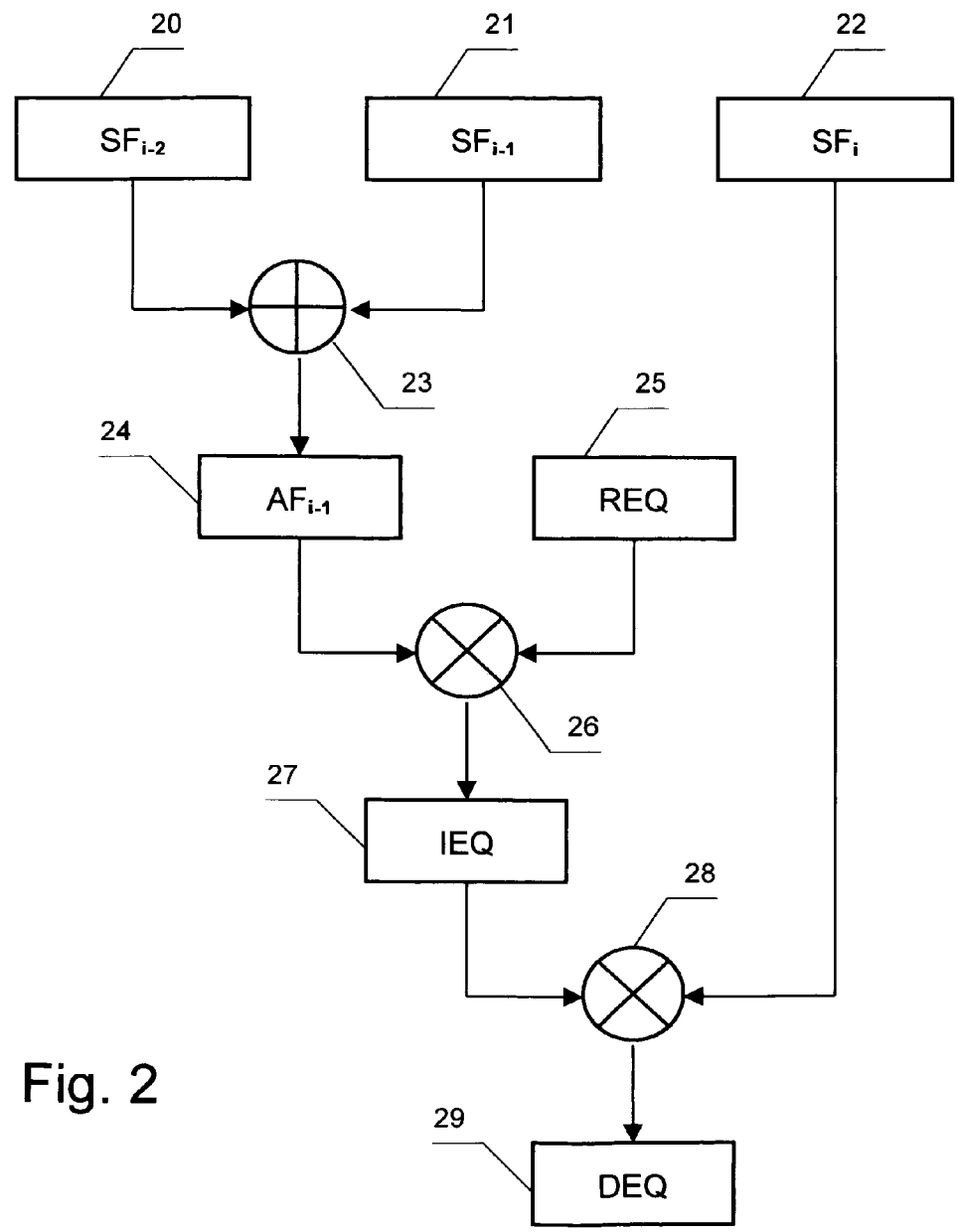
FIG. 2 illustrates audience formation in interactive environment.

A process of audience formation is performed by the traffic control server as illustrated by FIG. 2. Detecting requests submitted by multiple clients for the same content is similar to finding duplicate records in a file, which is performed by sorting the file and comparing all consecutive pairs of records. The FIG. 2 shows three sorted files of URL records 20-22 wherein file 22 contains URLs submitted in the current time interval and files 21 and 20 contain URLs submitted in two previous intervals. (There could be more than two previous intervals.) An operational module 23, which could be a computer program or ASIC (application-specific integrated circuit), detects audiences that are present in both previous intervals and places a URL record representing each such audience in a file 24. An operational module 26 processes each request 25 submitted in the current time interval against the file 24 and, if the URL is not in the file, directs the request to a queue 27 for immediate execution. The reason is that if a request was not submitted by multiple clients in two previous intervals then chances are it will be a request of single client in the current interval and therefore it should be executed with no delay. Otherwise the request will be executed at the end of current time interval in order to provide a time for audience formation. At the end of current interval, an operational module 28 processes the sorted file of URL records 22 for removing already executed requests, detecting audiences among remaining requests and directing requests on behalf of audiences and single clients to a delayed execution queue 29.

The process illustrated by FIG. 2 relies on prediction and therefore does not exclude mistakes in separation of requests submitted by single clients from requests submitted by multiple clients. However it still efficiently separates requests for content in high demand from requests for content in low demand.

The process perform a dynamic unified handling of both one-to-one and one-to-many data transmissions thereby providing a better way for integration of multicast and unicast traffic in such applications as multiparty games and cloud computing.

Comparing and sorting URLs themselves, which are long, variable-length strings of characters, would be extremely unproductive. The performance can be improved by providing URL records with an integer key. The key can be produced by a hash function, which converts a large, variable-sized amount of data into a single integer called hash value. The hash key is computed by each client device and submitted together with the URL to the traffic control server that, in turn, sorts the URL records by the key. In the sorted file, all consecutive records with identical keys are considered as an audience of the same content. A hash function however may map two or more different inputs to the same hash value. Therefore before submitting a request to a content hosting server on behalf of all clients in the audience, the audience needs to be verified, otherwise a user of a client device can get a content that is different from intended. Character by character comparison of URLs in each potential audience could exclude such a mistake in audience formation but would be unproductive for large audiences. A probability of mistake could be almost excluded if clients provide additional information, such as separate hash values for prefix, domain name and path parts of URL. For best performance the additional information should not be used for sorting URLs but only for verification of audiences after sorting. Although very rare, the mistake in audience formation still may occur so the user should be able to submit a retransmission request with a "complaint indicator", for example, using double click instead of single click, and then the request would be processed separately from the audience.

The most bandwidth savings provided by flow routing could be achieved in delivery of full-length high-quality video over the Internet. Today users overload provider's network and waste their own time waiting for download of a movie or show, while quality of picture in downloaded videos is not even close to that of high-definition TV. In case of live video, flow routing is the obvious choice because a live event, such as a sport event, can be watched live only at the time of the event and therefore simultaneously by all viewers. IP routing of a live stream i.e., transmission of separate live streams of the same event at different clients' addresses is a pure waste of bandwidth.

As to stored videos i.e., movies, shows and "taped" events, there is no urgency in watching them at the time of ordering. An ordered show could be transmitted overnight, downloaded automatically at the time of transmission by all client devices whose users have requested the show during the day, stored on clients' hard drives and presented to each user at the time of user's choice. The controlled delay for audience formation saves user time and network bandwidth. This approach could be further optimized by separating requests for content in high demand from requests for content in low demand so that videos in low demand would be delivered overnight while delivery of videos in high demand would be delayed to allow time for audience formation as illustrated by FIG. 2. If the chosen time interval is, for example, 4 days then the controlled delays in request execution will be in the range 1 to 4 days with average delay for 2 or 3 days.

Television-quality video could be downloaded onto an external hard drive and then watched on a large-screen TV by simply disconnecting the hard drive from computer and connecting it to a cable or satellite box via a USB cable and a USB port provided in the box.

The system of present invention as illustrated by FIG. 1 operates with two routing protocols. The flow routing is used for interior routing of content packets only while conventional IP is used for everything else including requests for content, content exterior routing and exchange of messages between clients and the traffic control server 15. However those are high-volume content flows, not the short messages, that consume most of network bandwidth. In particular, the traffic control server, which manages all requests for content, is not a bottleneck in the system because content packets go to clients over flow routers, not over the server.

Figure 3:
FIG. 3 illustrates layered Internet protocol.
Figure 3:
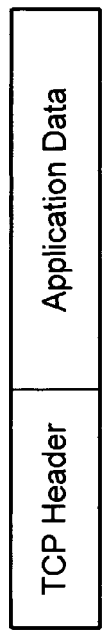
Figure 3:
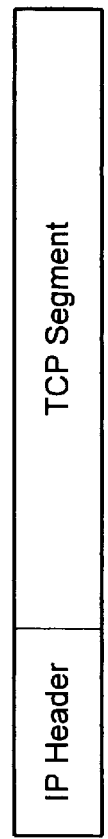
Figure 3:
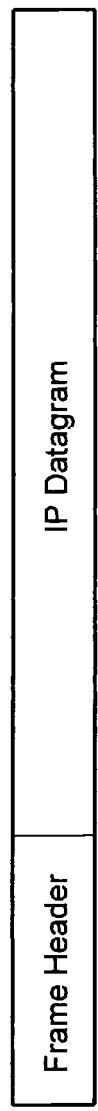

Internet protocol suite TCP/IP has five layers: application layer, transport layer, network layer, data link layer and physical layer. On the transmitting side, data is relayed from the highest application layer to the lowest physical layer by adding a header for each layer as shown in FIG. 3. At the receiving side, a packet is processed sequentially from the lowest physical layer to the highest application layer.

A data stream from the application layer (FIG. 3*a*) is fragmented into parts in the transport layer (FIG. 3*b*), and the parts are encapsulated into Transmission Control Protocol (TCP) segments. TCP is responsible for data exchange between applications run on different computers. It is a connection-oriented protocol that provides a flow control and a guaranteed error-free data delivery. In the network layer (FIG. 3*c*), TCP segments are encapsulated into Internet Protocol (IP) datagrams. IP is responsible for end to end packet delivery across multiple router-connected networks. Its primary task is to support internetwork addressing and packet forwarding. In the data link layer (FIG. 3*d*), IP datagrams are encapsulated into Ethernet frames or ATM cells to be transmitted over a physical layer i.e., a physical medium.

There are two schemes of network addressing: one in the network layer and the other in the data link layer. The network layer address (IP address) is used for end to end packet delivery across multiple router-connected networks. It is a combination of a network address and a node address within the network. The address is a 32-bit binary number divided into four 8-bit fields and contains two pieces of information: the left fields identify a network, i.e. a group of computers, and the right fields identify a host, i.e. a computer on the network. The 32-bit binary values are presented in a dotted-decimal notations like 182.16.3.24 for human convenience. For small number of large networks with many hosts, one 8-bit field is used as the network address and three fields are used as the host address. For large number of small networks with not many hosts, three fields are used as the network address and one field as the host address. IP addresses are placed in source and destination fields of IP datagram header shown in FIG. 4*a*.

In the data link layer, each network node, which is a server or client or router, has at least one Media Access Control (MAC) address. The address, also called link address, is used for packet delivery inside each LAN, such as L1, L2 and L3 in FIG. 1. MAC address is hardwired into Network Interface Card (NIC). To make it globally unique, the 48-bit address is divided into two parts: the left 24 bits are assigned to a NIC manufacturer and the right 24 bits are assigned by the manufacturer to a NIC. MAC addresses are placed in the destination and source fields of Ethernet frame shown in FIG. 5.

Both IP and MAC addresses have a value—all binary 1s—for the broadcast address, which is used for sending a message simultaneously to all nodes on a network. Broadcast messages are sent mainly for network management and diagnostic purposes. IP address 255.255.255.255 is the general broadcast address (decimal 255 fills the 8-bit field with all binary 1s). Routers block the address so that nobody could flood the Internet with a message sent to all computers. The broadcast IP address for a specific network has all 1s in the host portion only. Applications that produce broadcast messages include routing protocols such as RIP. The IP broadcast address however may not be used for delivery of a particular web content in one-to-many manner because not all computers on a network are supposed to receive that content but only those whose users want it.

In addition, there are IP and MAC addresses reserved for multicast. Ethernet, which is the most broadly used LAN technology, supports both broadcast and multicast addressing. Ethernet NIC, called also Ethernet network adapter, accepts packets addressed not only to its hardwired MAC address or to the broadcast address but also packets with a variable address from a multicast address range.

A conventional IP router processes IP datagram header (FIG. 4a). Along with the source and destination addresses the header specifies a protocol version number, a header length, packet fragmentation and reassembly information, maximum number of routers to pass, an error-checking value and other data. (Full information can be found in RFC 791 "Internet Protocol", September 1981). There are two types of routing over IP networks: hop-by-hop routing to the destination and explicit routing over a predefined pass. In the basic hop-by-hop routing, each router is responsible for determining the next hop, not the complete path. The advantage is that the path may change at any time due to traffic problems or failing links. In the explicit routing, the pass is determined in advance and packets are forwarded without the need to make routing decisions at each router along the pass. The advantages of explicit routing are routing speed and the possibility of traffic engineering, which includes bandwidth management, prevention of routing loops and providing quality of service (QoS) over traffic prioritization.

MPLS (Multiprotocol Label Switching) is the most important Internet protocol of explicit routing used in the Internet backbone. Flow routing according to the present invention is a kind of explicit routing that uses a modified datagram header shown in FIG. 4b to forward packets across the networks along a predetermined pass. For all other purposes, such as packet fragmentation and reassembly, the header is the same as the IP header shown in FIG. 4a but the destination address field is nullified by all binary 0s and the source address is replaced by flow number. This makes a clear difference between IP and flow routing because IP routers will not forward packets without a destination address.

Router may be a stand-alone dedicated device from a vendor such as Cisco Systems, or a computer with two or more NICs running a network operating system like Novel NetWare, Sun Microsystems's Solaris or Microsoft Windows 2000. A hardware-based router called "layer 3 switch" uses ASICs and network processors to improve routing performance. Flow routers can be implemented as additional software installed on existing IP routers or as separate routers. In other words, any router on the network may be either an IP only router or a flow router or a two-protocol router.

If the content hosting server is located outside of regional domain, content packets are delivered to the regional domain according to an exterior routing protocol such as BGP (Border Gateway Protocol). The packets enter the regional domain over shown in FIG. 1 flow router 13 connected to an Internet backbone. The traffic control server 15 provides the flow router 13 with an external destination address and an internal flow number, both assigned to the content URL. The router removes the destination address and places the flow number in the space of source address as shown in FIG. 4a,b. There could be more than one entry point to the regional domain, in particular, over private peering links provided at so called Internet exchanges and network access points. If the content hosting server is located inside of regional domain, as the server 16 in FIG. 1, then the traffic control server provides the flow router 14 with a destination address and a flow number assigned to the content URL.

The traffic control server selects an internal path for each content flow over a sequence of flow routers using a routing table that is configured either manually or with the help of known in the art routing protocols, such as RIP (Routing Information Protocol) or OSPF (Open Shortest Path First). The protocols are using routing algorithms to gather information about network topology. The pass is formed as a plurality of entries placed in flow-forwarding tables of selected flow routers. When the traffic control server sets up a path it sends a notification to each flow router along the pass with a command to insert table entries for a content identified by a flow number. After the content transmission is completed, the server takes down the path by sending a notification to each router with a command to delete table entries related to the flow number.

When a packet arrives at a flow router, the router strips the input frame information, retrieves the datagram, reads the datagram header shown in FIG. 4b and looks up its flow-forwarding table. FIG. 6 shows layout of the flow-forwarding table entries. The entry shown in FIG. 6a says that if a packet with the specified IP destination ddress arrives at the specified input port, the address is to be replaced with the specified flow number, encapsulated in a frame with the specified destination and directed with the specified priority to the specified output port. For example, a live video may have higher priority than a stored video. If the packet goes to other flow router then the frame destination is a specific (hardwired) MAC address of that router and, if packet goes to a client or clients, the frame destination is a MAC multicast address. Respectively, if a packet is forwarded to clients and to other router, then two entries are included in the flow-forwarding table and two frames are to be directed to the output port. The entry shown in FIG. 6b says that if a packet with the specified flow number arrives at the specified input port, it is to be encapsulated in a frame with the specified destination and directed with the specified priority to the specified output port.

A client device obtains the flow number assigned to the requested URL from an individual notification sent by the traffic control server at the client IP address. An extension of web browser, which is designed to support flow routing in the application layer, processes the individual notification, extracts the flow number and relays the number down to the network layer. During the flow transmission an extension, which is designed to support flow routing at the network layer, accepts incoming packets with the flow number in the packet's datagram header and relays the packets up to the transport layer for further processing.

In conventional IP multicast technology, a content source sends packets to a "group address", which is a special form of IP address (class D address) designed for multicasting, and a link layer i.e., MAC multicast address is produced by mapping the class D address to an Ethernet multicast address. According to IPv4 IGMP protocol, addresses in the MAC multicast address range start with 25-bit multicast prefix (01-00-5E in hexadecimal followed by zero bit) thus leaving 23 bits to map the multicast network layer address. The 32-bit IP group address is mapped to the MAC multicast address by placing the low-order 23 bits of the IP address into the low-order 23 bits of the MAC address. Different 32-bit IP addresses with the same 23 low-order bits are mapped to the same MAC multicast address and therefore some unintended packets may come through the data link layer and reach the network layer, where they are filtered out by CPU and thus negatively affect the client performance.

The system of present invention does not use class D addresses in the network layer but uses variable MAC multicast addresses in the link layer. In the system, a MAC multicast address is produced by mapping 32-bit flow number to Ethernet multicast address so that a frame directed to a link would be accepted by Ethernet NICs of all clients connected to the link and provided with the flow number. As to multicast address collisions, they can be completely avoided if the traffic control server limits the range of assigned flow numbers from 1 to $2^{23}-1$ so that different MAC multicast addresses would be produced for different flow numbers. This would limit the number of concurrently transmitted flows over the regional domain to 8,388,607 but the limit applies to content, not to number of clients. For example, if 10,000,000 users in a regional domain are watching the same popular sport event, all their client devices are receiving the same single flow of packets with the same flow number.

In FIG. 1, the flow router 13 has one input port and one output port and the flow router 14 has one input and two output ports. If one or more clients 17 connected to link L2 request a content from a hosting server located outside of the regional domain, the traffic control server 15 sets a pass providing the flow-forwarding table of router 13 with an entry as shown in FIG. 6a specifying an IP destination address and a flow number, both assigned to the content URL, and a specific MAC address of input port of flow router 14. Also it provides the flow-forwarding table of router 14 with an entry as shown in FIG. 6b specifying the flow number, the output port connected to L2 and a MAC multicast address that is produced by mapping the flow number to Ethernet multicast address. If then another client connected to L2 will request the same content, the traffic control server will provide the client with the flow number but no entry will be added to either of the routers 13 and 14. However if a client connected to link L3 will request the same content then a new entry will be added to the flow-forwarding table of router 14 specifying the output port connected to L3. If a client or clients connected to L2 and/or L3 request a content from a hosting server located inside of the regional domain, such as the server 16 in FIG. 1, no entry will be inserted in the table of router 13 and entries as shown in FIG. 6a will be inserted in the table of router 14 that specify an IP destination address and a flow number assigned to the content URL.

The guaranteed error-free data delivery over the Internet is provided by an acknowledgement mechanism of TCP protocol. According to the protocol, the sender retransmits a packet if the receiver does not acknowledge the reception of the error-free packet. The positive acknowledgement or ACK provides for both packet recovery and congestion control. In other transport layer protocols built on the top of UDP (User Datagram Protocol) a "negative acknowledgement" or NAK, which is a request for retransmission of lost or corrupted packet, is used for packet recovery only. In the system of present invention, congestion control is a function of traffic control server. For this reason client devices submit NAKs to the traffic control server in the same way as the original request for content adding a packet sequence number to the request. However in order to simplify request processing and thus to improve performance, the URL may be replaced by a flow number that is already assigned to the URL. The traffic control server sends to the content hosting server a single NAK on behalf of all clients submitted NAKs with the same flow number.

Transmission errors in audio and video, although annoying, can be localized but many other web objects are not error-tolerant. Computer programs with errors do not work while errors in data sets and databases are normally unacceptable. Flow routing with packet recovery may improve video broadcast over the Internet and provide a guaranteed error-free delivery for both one-to-one and one-to-many data transmissions.

Although the invention is described herein with reference to the preferred embodiment, it is to be understood that modifications can be made by those skilled in the art without departing from the spirit or scope of the invention. Accordingly, the invention should only be limited by the claims included below.

What is claimed is:

1. A system for reducing Internet congestion and latency comprising:

in an Internet regional domain, client devices for submitting requests for a web content identified by a content URL and receiving packets with a flow number assigned to the URL and included in a packet datagram header;

flow routers in the regional domain for directing packets to said client devices, said flow routers being operative for replacing a destination address included in a packet datagram header by a flow number and forwarding packets by the flow number; and a traffic control server for receiving requests from said client devices for a web content identified by a URL and assigning a flow number and a destination address to the URL, said traffic control server further being operative for:

(a) providing client devices submitted said URL with said flow number;

(b) setting up an interior pass across the regional domain over a sequence of said flow routers by providing flow routers along the pass with said destination address and said flow number; and (c) submitting a request with said URL and said destination address to a content hosting server;

thereby enabling client devices that have submitted requests for the same web content to receive the same single flow of packets and thus to prevent congestion and as a result, delays in content delivery that may be caused by multiple separate flows of the same content transmitted from the content hosting server to clients at different clients' addresses.

2. The system of claim 1 wherein said traffic control server further being operative for separating requests for content in high demand from requests for content in low demand so that requests for content in low demand could be submitted immediately while submitting requests for content in high demand could be delayed in order to provide a time for audience formation.

3. The system of claim 1 wherein said traffic control server further being operative for providing quality of service via traffic management and prioritization.

4. The system of claim 1 wherein said traffic control server selects said destination address from a pool of addresses allocated to the regional domain.

5. The system of claim 4 wherein said traffic control server selects said destination address and said flow number randomly for concealing from an outside observer the real packet destination and thus improving Internet security via anonymity of communications and privacy protection.

6. The system of claim 1 wherein said client devices further being operative for submitting requests for retransmission of a lost or corrupted packet to said traffic control server and the server further being operative for sending a single retransmission request to the content hosting server on behalf of all clients receiving the same content, thereby providing for the packet recovery.

7. The system of claim 1 wherein said flow routers further being operative for transmitting packets over a link in Ethernet frames with a link-layer multicast address in a frame destination field, said multicast address being produced by mapping said flow number to an Ethernet multicast address.

8. The system of claim 7 wherein said traffic control server selects flow numbers in a range of numbers limited so to provide different Ethernet multicast addresses for different flow numbers thereby avoiding multicast address collision.

* * * * *